(12) United States Patent
Liu et al.

(10) Patent No.: US 10,043,069 B1
(45) Date of Patent: Aug. 7, 2018

(54) ITEM RECOGNITION USING CONTEXT DATA

(71) Applicant: Amazon Technologies, Inc., Reno, NV (US)

(72) Inventors: Yue Liu, Brighton, MA (US); Utkarsh Prateek, Natick, MA (US); Avnish Sikka, Acton, MA (US); Matthew Daniel Hart, Cambridge, MA (US); Emilie Noelle McConville, Boston, MA (US); Sonjeev Jahagirdar, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/196,669

(22) Filed: Mar. 4, 2014

(51) Int. Cl.
*G06K 9/00* (2006.01)
(52) U.S. Cl.
CPC .............................. *G06K 9/00422* (2013.01)
(58) Field of Classification Search
None
See application file for complete search history.

(56) References Cited

U.S. PATENT DOCUMENTS

| | | | | |
|---|---|---|---|---|
| 2010/0048242 A1* | 2/2010 | Rhoads | ............. | G06F 17/30244 455/556.1 |
| 2011/0238646 A1* | 9/2011 | Chamberlain | .... | G06F 17/30864 707/706 |
| 2012/0176509 A1* | 7/2012 | Aravamudan | ... | H04N 21/41407 348/231.3 |
| 2014/0201122 A1* | 7/2014 | Park | ......................... | G06N 5/02 706/46 |

OTHER PUBLICATIONS

Google Goggles, "https://www.youtube.com/watch?v=Hhgfz0zPmH4", Uploaded on Dec. 6, 2009, screen shots.*
Byford, Google Goggles 1.7 Update Adds Continuous Scanning and Automatic Article Search, market.android.com, Dec. 8, 2011.
Ludwig, Hands on with Amazon's Flow Augmented Reality Shopping Application for iPhone, venturebeat.com, Nov. 3, 2011.
Robertson, Amazon's Flow Augmented Reality Shopping App Comes to Android with Added QR Reader, theverge.com, Jul. 2, 2012.
Flow Powered by Amazon, Discover the World Around You, A9.Com.Inc.

* cited by examiner

*Primary Examiner* — Randolph I Chu
(74) *Attorney, Agent, or Firm* — Pierce Atwood LLP

(57) ABSTRACT

A system for recognizing objects and/or text in image data may use context data to perform object/text recognition. The system may also use context data when determining potential functions to execute in response to recognizing the object/text. Context data may be gathered based on device sensor data, user profile data such as the behavior of a user or the behavior of those in a user's social network, or other factors. Recognition processing and/or function selection may be configured to account for context data when operating to improve output results.

25 Claims, 9 Drawing Sheets

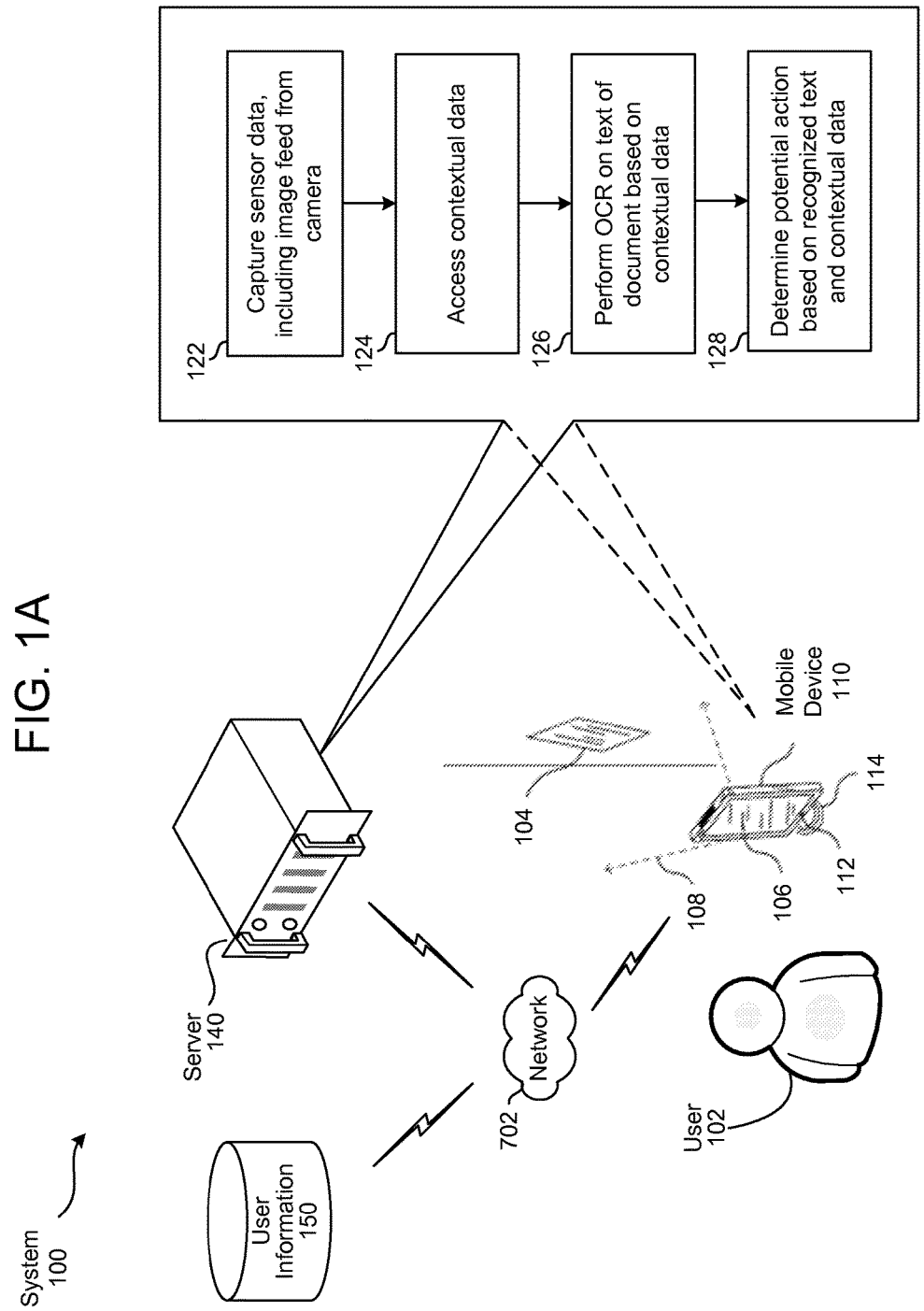

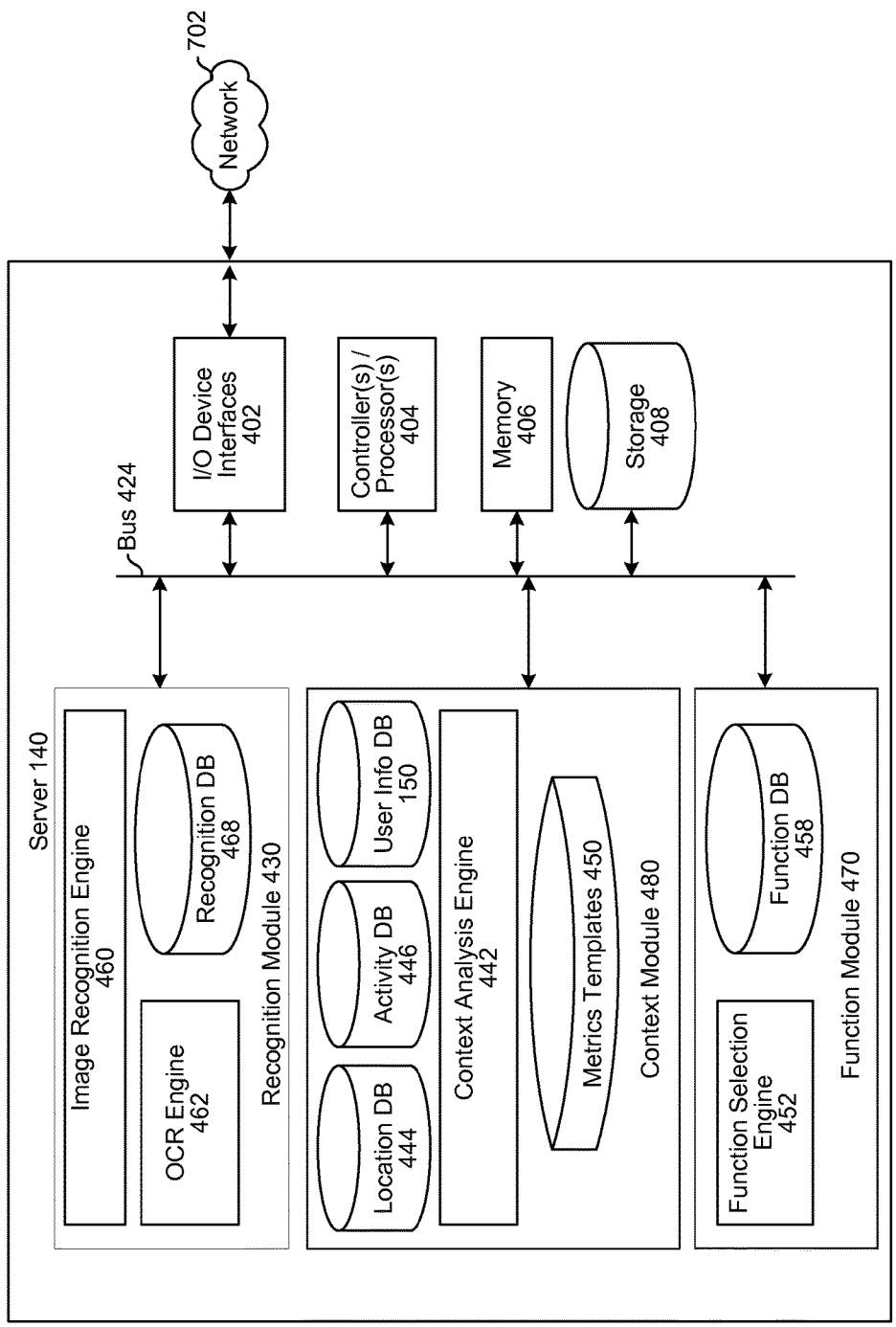

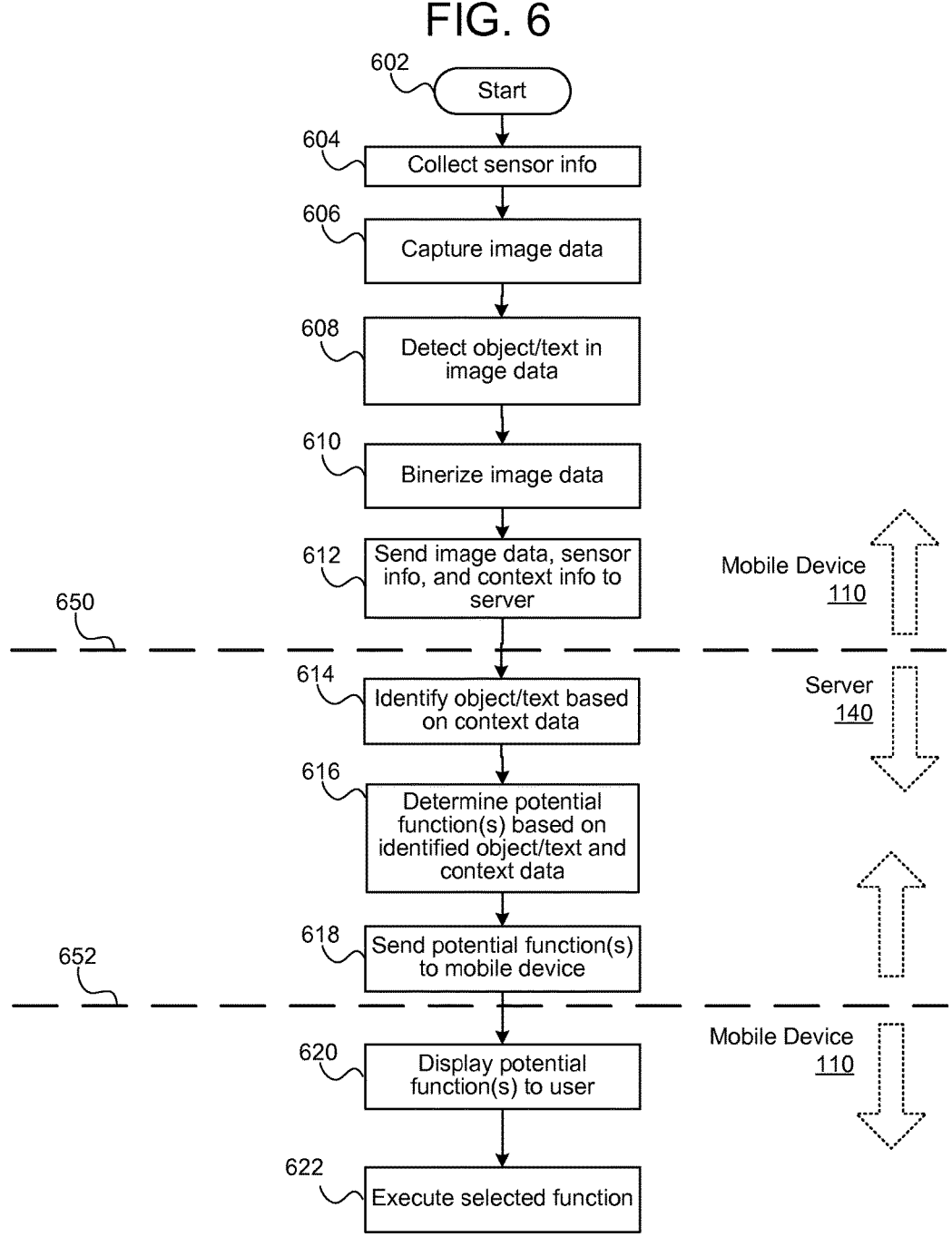

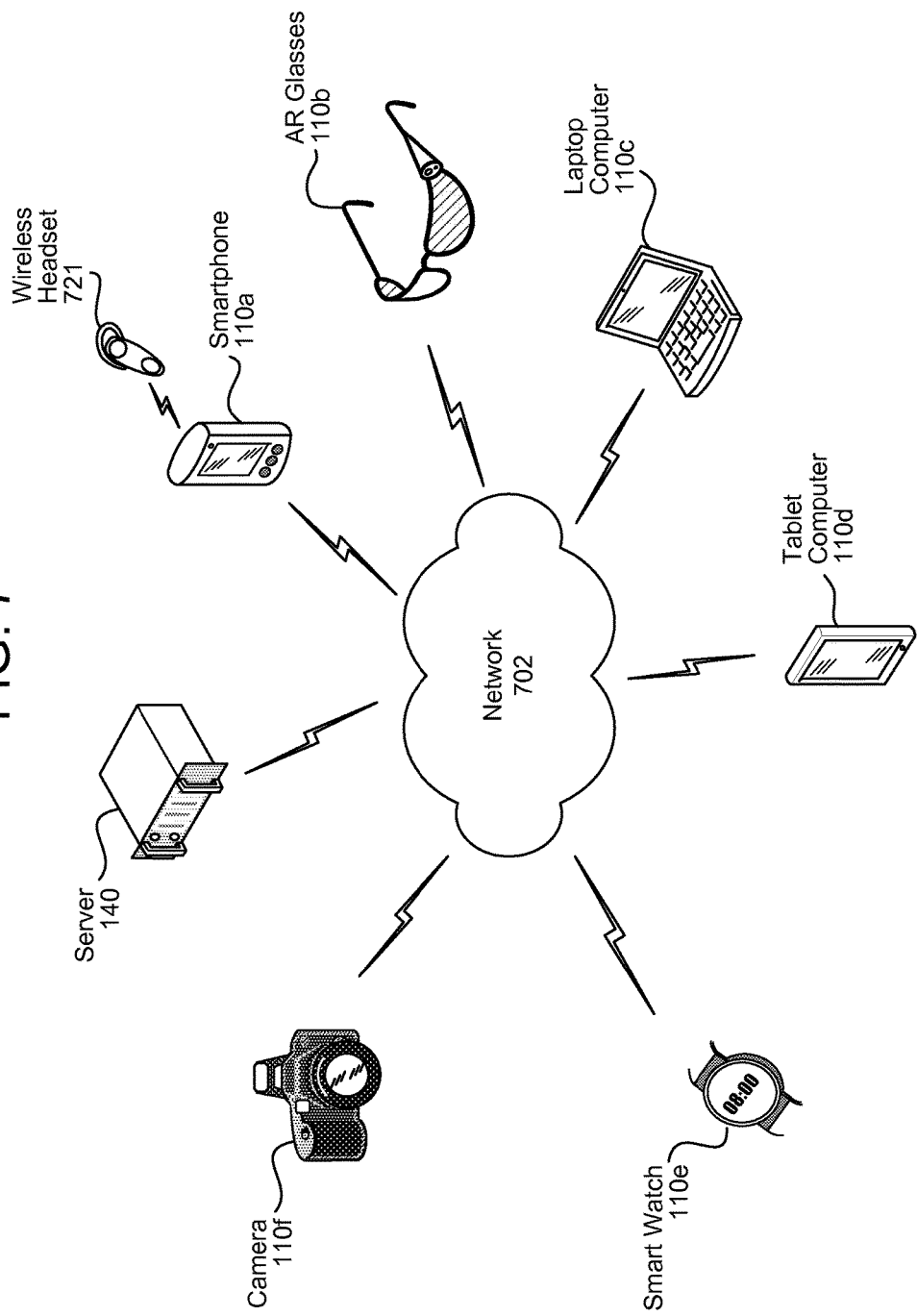

ITEM RECOGNITION USING CONTEXT DATA

BACKGROUND

People are increasingly utilizing portable electronic devices to perform a wide variety of tasks. As an example, people can utilize a camera of such a device to capture an image of an object. For example, a user can use a camera to capture a still image or video on things in the environment in the camera's field of view. There might be multiple objects in an image or video, and the user may not be able to determine what the objects are or know much about them.

BRIEF DESCRIPTION OF THE DRAWINGS

For a more complete understanding of the present disclosure, reference is now made to the following description taken in conjunction with the accompanying drawings.

FIGS. 1A and 1B illustrates an example of a user using a portable computing device to capture an image of an object that can be utilized in accordance with various aspects;

FIG. 4 is a block diagram conceptually illustrating example components of a server supporting frictionless collection of user opinions.

FIG. 6 is an example of an algorithm supporting frictionless collection of user opinions.

FIG. 7 illustrates an example of a computer network including devices supporting frictionless collection of user opinions.

DETAILED DESCRIPTION

Figure 1B:
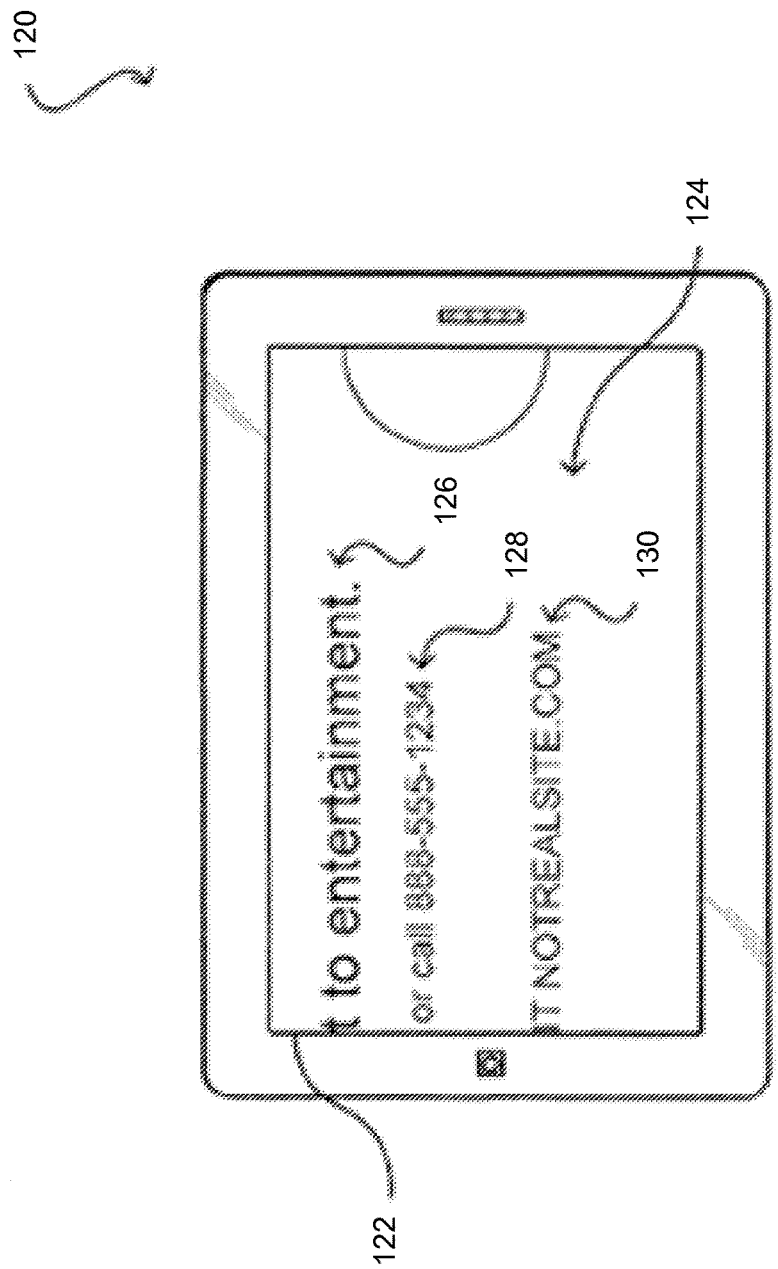

Computing devices may assist users in identifying previously unidentified documents or things. The devices may also identify certain text in a document and provide the user with an device-executable action associated with the text. For example, a device may take an image of a business card and allow a user to perform various functions such as calling a number on the business card, sending an email to an email address on the business card, locating the business address on a map program, or the like.

To improve such recognition efforts, and to improve the user experience by offering the user more desirable executable functions, a computing system may make use of context data to both perform recognition processes (including optical character recognition) and to determine what actions should be offered to a user in view of the recognition results. As described below, context data may include a wide variety of information such as user specific data (including, for example, social network data associated with the user, the user's device usage history, the user's history using other devices associated with the user, the user's purchase history, other user history or other user specific information), data associated with other individuals having something in common with the user (i.e., history of the user's social network friends, history of others in a user's same age/occupation/residential area/other demographic or other category), data associated with contemporaneous events (i.e., data related to seasonal activities, sporting activities, newsworthy events) or other such information. Information such as the user specific data, data associated with other individuals having something in common with the user or other user related data may be stored in a user profile. The context data may include the user profile. Such context data may improve recognition results and may provide a user with more relevant potential actions based on the recognition results.

Various other applications, processes, and uses are presented below with respect to the various aspects.

FIG. 1A illustrates an example situation 100 wherein a user 102 is interacting with a mobile computing device 110. Although a mobile computing device (e.g., a smart phone, an e-book reader, or tablet computer) is shown, it should be understood that various other types of electronic devices that are capable of determining and processing input can be used in accordance with various aspects discussed herein. These devices can include, for example, desktop computers, notebook computers, personal data assistants, cellular phones, video gaming consoles or controllers, smart televisions, a wearable computing device (e.g., a smart watch or glasses), and portable media players, among others. In this example, the computing device 110 has at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the user 102 is interested in obtaining information about a particular document 104. This could include, for example, text contained in the document or information about the document itself, among other such information. The device can use sensor data from other sensors for capturing information as well, such as at least one microphone(s) 112 operable to capture audio data 114 or a position sensor for acquiring position data, among others.

Sensor data can include, for example, images or video data acquired by a camera, audio acquired by a microphone, position data acquired by a global positioning system, and any other appropriate data capable of being acquired by one or more sensors (or other such components) of a computing device. The objects can include tangible and/or intangible objects, such as may include, for example, text strings, bar codes, songs, movies, products, weather-related information, and other types of items, events, and/or occurrences.

In this example, the document 104 contains information that might be of interest to the user. This information includes, for example, a body of text, a phone number, and a web address. The document 104 may include both text-based and non-text based information. For example items such as the picture of a product, music album cover, poster, road sign, etc. may include both text-based and non-text based information. Although illustrated as a document the device may also capture an image of an item that is not a document such as a product, landmark, etc. Such an item may lack text-based information but may include image based information. The user might want to acquire any or all of this information for any of a number of reasons, and/or to perform any number of actions such as to update contact information, call the number, access a website associated with the address, and so on. In order to obtain this information, the user can position the computing device 110 such that at least the relevant portion of the document 104 is within a field of view 108 of at least one camera 106 of the computing device. The resulting image can then be displayed on a display screen 122 of the computing device, as illustrated in the example situation 120 of FIG. 1B. The image 122 can be a still image that was captured by the camera, or can be a frame of a "live" view as captured by a video mode of the camera, camera mode of the device, etc. As illustrated, the image 122 can include information 124 from the document. Each instance of captured information can be referred to as a representation of an "object," which can be analyzed by software running on, or remote from, the device. In this example, the objects that can be recognized from representations of those objects in the image can include objects such as a string of text 126, a phone number 128, and a web address or uniform resource locator (URL) 130. Various other types of objects can be recognized in other examples as discussed and suggested elsewhere herein. The image can be processed to attempt to recognize the text, which then can be utilized by the user for any of a number of different purposes.

Using a conventional approach, the user can cause the image to be captured and uploaded to a server that is capable of running one or more image recognition or analysis algorithms on the image to attempt to identify text within the image. This can include, for example, at least one optical character recognition (OCR) algorithm.

Returning to FIG. 1A, the device 110 may communicate over network 702 with a server 120. The device 110 and/or server 120 may also be in communication with other sources of information such as user information storage 150. In other aspects the user information may reside in whole or in part on server 120 and/or device 110. The user information may include information associated with user 102 such as contact information, history of user operation of device 110, user social network data, or the like. The device 110 may capture sensor data, including image feed from the camera 106, position data, audio data, etc., as shown in block 122. The device 110 and/or the server 120 may then access context data, as shown in block 124. Context data may include the sensor data, user information, or other information associated with the context such as information related to other user actions being performed with respect to the location of the device 110, by users similar to user 102, historical behavior by the user 102 and/or device 110, information regarding documents like document 104, etc. The device 110 and/or server 120 may then perform OCR on the document 104 using the context data to inform the OCR results, as shown in block 126. The device 110 and/or server 120 may then determine a potential action and/or function based on the recognized text and context data, as shown in block 128. The potential action and/or function may be performed by the device 110 and/or server 120 without intervention by the user 102 or may be offered to the user as a potential action (for example, along with other action choices), as described below. Although illustrated as being performed by the device 110 and/or the server 120, the above steps may be performed by the device 110 alone or by the server 120 alone or in any combination thereof.

Aspects of recognizing information as detected by a device, and determining actions to perform based on recognized information, such as the information illustrated in FIG. 1B, are describe below.

Figure 2A:
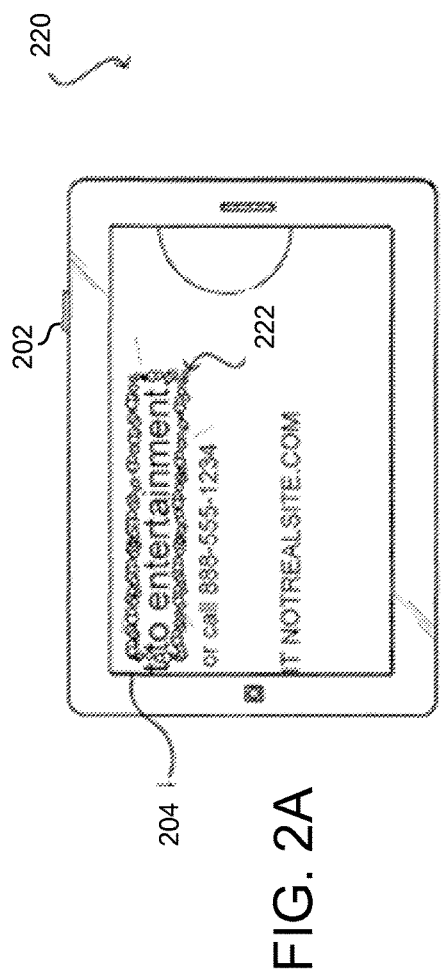
FIGS. 2A-2D illustrate an example interface that conveys to a user which objects are recognized in a current view, as well as actions that can be accomplished using those objects, that can be utilized in accordance with various aspects.

In addition to simply displaying information of a video feed, such as that shown in FIG. 1B, various aspects may also provide an interface that enables the device to convey which objects in the information have been recognized, such as by displaying a set of virtual "fireflies" or other types of graphical elements over a live view of image (e.g., video) data being acquired by the device. The graphical elements may activate in a manner to indicate that some object in the image may be recognized by the device, such as by creating a dynamic bounding box around a representation of each such object or forming an appropriate shape on the display. For example, the graphical elements may be animated or otherwise configured to appear to gather by, be contained in, or otherwise associated with at least one launch button, for example, which may include a physical hardware button, a virtual button displayed on a touch screen, or another such user-selectable element where selection of the launch button by the user may instigate a further action, as detailed below. The graphical elements may then change their appearance upon selection of the launch button. For example, in response to recognizing an object, some or all of the graphical elements can be rendered to form an animated shape, such as by being animated to appear to move across the display and form an animated bounding box 222 proximate the representation of the recognized object as illustrated in the example situation 220 of FIG. 2A.

A device may enter a discovery mode in response to a user selection (such as selecting a discovery application), in response to power on (or wake up) of the device or through some other way. Once in discovery mode the device may continuously process the device sensor data to attempt recognition of items or may begin a recognition attempt in response to a user depressing a button 202, or the like. By beginning recognition attempts in response to a button press (or the like) the device allows the user to position the device in a desired way, for example to isolate a desired document, prior to attempting recognition. In some aspects, however, a device might not include any buttons at all and might be controlled only through a combination of visual (e.g., gesture) and audio (e.g., spoken) commands such that a user can control the device without having to be in contact with the device.

Different recognition algorithms and/or services may be used to perform object recognition to recognize different types of objects. For example, a string might be recognized as text that matches a determined pattern, such as a pattern indicating the text is a phone number or URL. Accordingly, information for these objects might be processed by a different algorithm or process. The different types of processing therefore can result, in at least some aspects, in different objects being recognized at different times. Similarly, different objects might be recognized at different times due to changes in the image that enable different portions to be recognized at different times, among other such options.

Figure 2B:
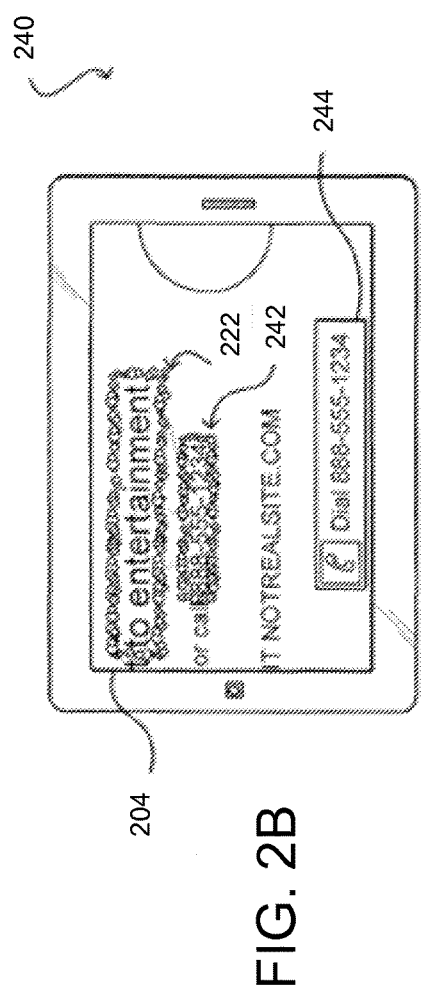

In response to a second object being recognized, as illustrated in the example situation 240 of FIG. 2B, the graphical elements may create a bounding box 242 or other such indication about the second recognized object, here a phone number. Such presentation can indicate to the user that both objects surrounded by bounding boxes have been recognized and/or identified. In different aspects, the graphical elements may bound the phone number at different times, such as when the string is identified as a text string, when the string is identified as a phone number, or when information for the phone number is located, among other such options. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

In various aspects, a type of the object can also be determined. In at least some aspects, this can include at least an "actionable" or a "non-actionable" type, or equivalent(s). For example, a text string such as "to entertainment" might be a portion of text that can be handled as normal text, such as for copying and pasting, which might not be considered an actionable object/text in at least some aspects (while being considered actionable in others). Objects/text such as a phone number or URL might be considered to be actionable objects as the computing device can perform at least one specific function with respect to each of these objects that might be of interest to a user. For each actionable object, every recognized object, or at least one recognized actionable object, for example, the interface can provide a user-selectable input, icon, or element associated with the representation of that object. In other aspects, a user-selectable input or element might be provided for each recognized object, or a specific subset of recognized objects, among other such options. Objects such as barcodes and quick response (QR) codes might be considered either actionable or not actionable objects in different aspects. Similarly, objects such as songs might be considered actionable if the software is linked to a song identification and/or purchasing source, and text might be considered actionable if a translation is available.

In various aspects, the user-selectable icon can take the form of what will be referred to herein as a "ribbon" 244, although various other types of elements or objects can be utilized as well within the scope of the various aspects as discussed and suggested elsewhere herein. In this aspect, a ribbon 244 may be comprised of at least two parts: information about the object and information about at least one action that can be taken. As illustrated, the ribbon can list the phone number that was recognized, such that the user can determine whether the phone number was properly recognized before using the number. The ribbon can also identify the action that can be taken, in this case using a phone icon and including the word "dial," although various other indications can be used as well. In some aspects the user might be able to select from different options or cause a specific action to be associated with a type of object, such as where a user would like to send a text, or make a video call instead of a conventional phone call, among other such options.

In some aspects, a ribbon might have two touch targets: a first target that comprises approximately 80% of the area of the ribbon that enables the user to select the primary action, and a second target of approximately 20% of the ribbon area that enables the user to go to a detail card, or other such element, that provides other actions or plugins applicable to that object, as well as potentially a copy of the image that was used to recognize the object for context, among other such possibilities. As discussed, a ribbon in some aspects can include at least three things to display: an image relating to the object, a title or name of the object, and a source of disambiguation, such as an author or artist name to help a user distinguish that object from other objects with the same or similar names or titles, etc. Ribbons (or other user-selectable icons) can also provide different actions for various types of objects. For example, a ribbon can include an action to purchase or download a song that was recognized from audio data, or to play a movie that was recognized from audio data and/or video data captured by one or more sensors of the device.

In this example, the ribbon is displayed near the "bottom" of the display for the current orientation, although other places can be utilized as well. In at least some aspects, the ribbon 244 can remain on the screen for at least a determined period of time, whether or not the corresponding representation of the object is still visible in the display or otherwise accessible to the device. For example, a user might point the camera towards the number in order to have the phone number accessible via the device. Once captured and/or recognized, the user might no longer want to continue to hold the device with the number in the field of view of the camera, and might want to bring the camera to a more comfortable position in order to touch the ribbon or otherwise check and dial the number. In some aspects, the user might want the device to store the number to dial at a later time that is more convenient for the user. In any of these or other such cases, it can be desirable for the device to display the ribbon for a period of time, or at least enable the user to access the ribbon at the appropriate time.

Figure 2C:
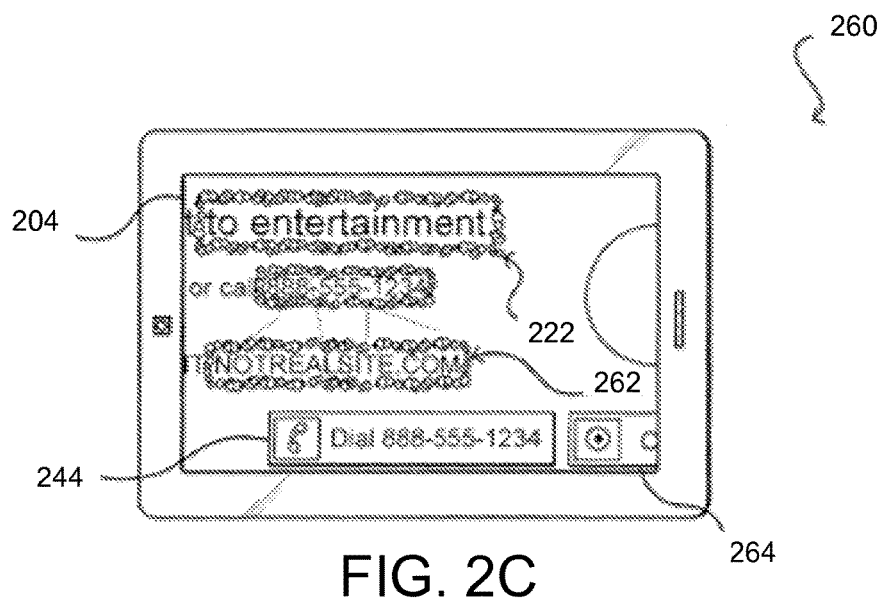

As illustrated in the example situation 260 of FIG. 2C, the device might recognize additional objects as well, such as by using additional algorithms, plugins, services, or processes or when the portion or quality of the captured image changes, among other such options. In this example, another object is detected, which causes an additional bounding box 262 to be created. Since the object is actionable, an additional ribbon 264 can be created that enables the user to cause a specific action to be performed with respect to the newly recognized object. In some aspects where multiple actions can be performed with respect to an object, multiple ribbons can be displayed on the display screen. In other aspects, a ribbon might have more than one label, with each label referring to a different possible action. For example, the sensor data might include a representation of a movie theater sign, a newspaper advertisement, musical sounds and/or various other objects, where a user might want to call (e.g., for reservations/tickets) or learn more information about the object (see artist's website, watch movie trailers, view menu, etc.) before doing so. Labels also can indicate functionality such as an ability to visit a third party's social media page (e.g., a social media page for a restaurant or musical artist represented in the poster/ad). In the illustrated example the first ribbon is displayed in a center portion of the display with additional ribbons added to the right, although in other aspects the newer ribbons can be presented in the center and can be animated to appear to "push" the older ribbons to the right or left, among other such options. In order to access the other ribbons, then, the user can swipe, scroll, or otherwise navigate to those ribbons using any of a number of navigational approaches used for such purposes.

Figure 2D:
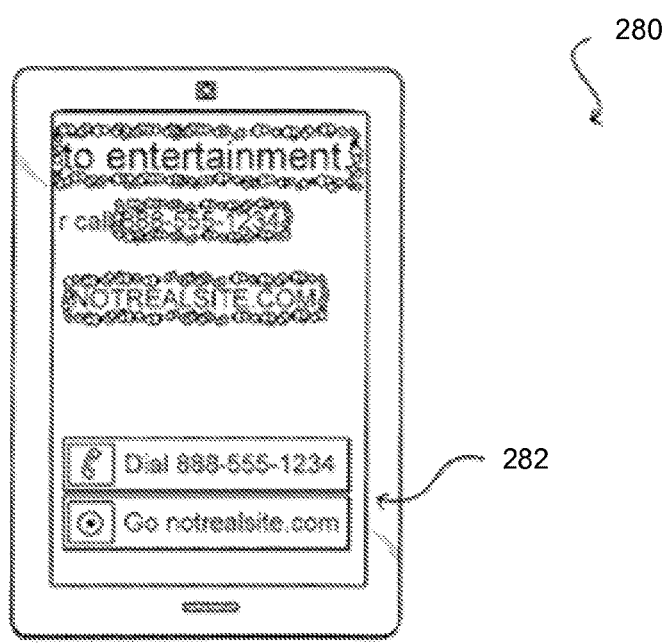
Figure 3A:
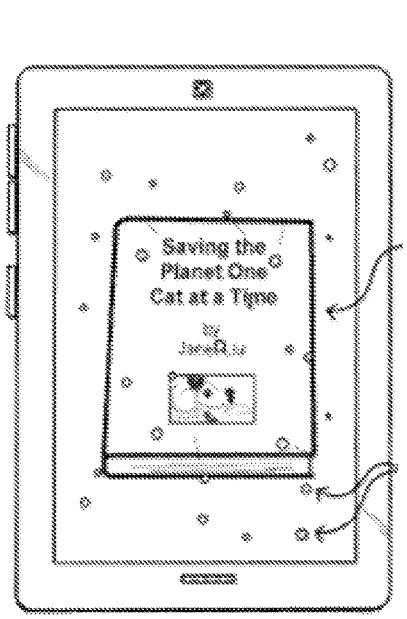
FIGS. 3A-3D illustrate an example interface enabling a user to perform an action for a recognized object that can be utilized in accordance with various aspects.
Figure 3B:
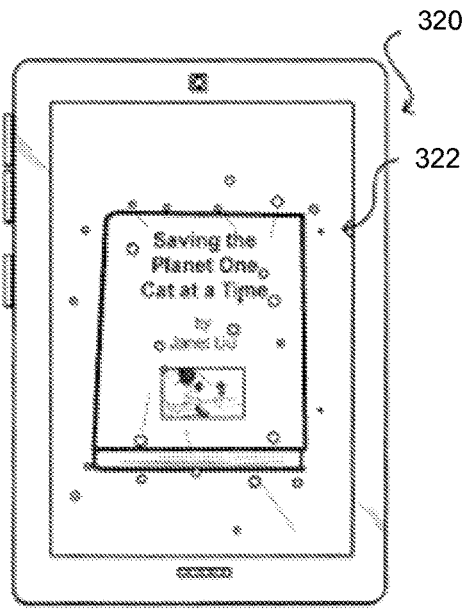
Figure 3C:
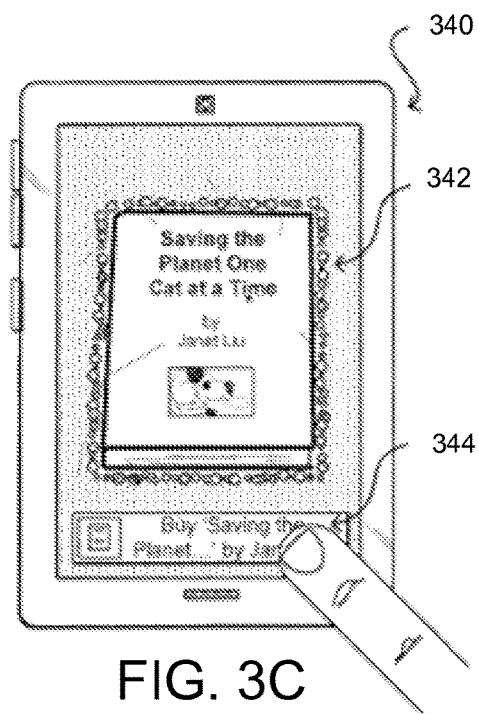
Figure 3D:
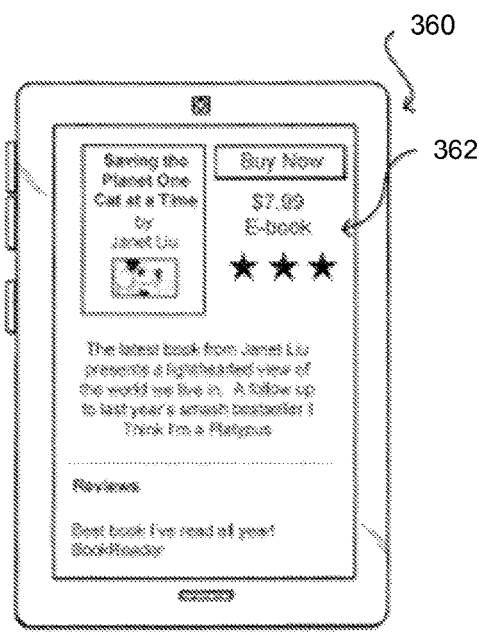

As illustrated in the example situation 280 of FIG. 2D, the ribbons 282 can also be displayed to appear to be stacked vertically on top of one another, among other such options. In this example, the first ribbon appears on top with the others appearing below, while in other aspects the most recently generated ribbon can always appear on top, among other such options. As new ribbons are generated and the number of ribbons exceeds the number of ribbons that can be displayed, as may be a fixed, variable, or user-configurable number, for example, the older ribbons can be "pushed" off screen, but available to the user via one or more navigational approaches as discussed elsewhere herein. Various other approaches for displaying, moving, and navigating ribbons or other selectable elements can be utilized as well within the scope of the various aspects.

FIGS. 3A through 3D illustrate another example interface that can enable a user to perform an action with respect to a recognized object in accordance with various aspects. In this example, as illustrated in the situation 300 of FIG. 3A, a user might be interested in obtaining information about a particular item, in this case a book 302. As discussed elsewhere herein, the user can have (or place) the device in a discovery mode, or otherwise have the camera capturing image information that can be analyzed to attempt to recognize one or more objects in a field of view of the camera. In this case, an image of the book 302 is captured by the camera and the image is displayed in the live view on the display of the computing device. As mentioned previously, the device can display a group of graphical elements 304 that, at least initially, can move or flash about the display screen at relatively random (or at least somewhat scattered) fashion. In some aspects, one or more algorithms executing on the device can begin to locate features in the live view that might correspond to recognizable objects. As discussed, these can include things like edges, transitions, end points, and other features or aspects that can be used for tasks such as computer vision and image recognition as known or used in the art. In the example situation 320 illustrated in FIG. 3B, at least some of the graphical elements 322 can begin to move towards at least some of these features as they are identified. For example, since the edges of the book will likely be detected as potential recognizable features, at least some of the graphical elements 322 can begin to move and/or appear near the edges of the book. Once the object is identified, the fireflies can move to create a bounding box 342 or other indication about the recognized object, as illustrated in the example situation 340 of FIG. 3C. In some aspects, as illustrated, other portions of the live view can appear to darken, change in color or brightness, or otherwise be modified to further highlight the portion of the image that corresponds to a recognized object. In this example, the object was identified as a book available for purchase, whereby a ribbon 344 is displayed on the display screen. The ribbon in this example includes an image of the book, as may be obtained from a product data store, and the ability to purchase or obtain additional information about the book. In this example, the user is able to select the ribbon 344 to cause the device to navigate to a web page 362 that enables the user to purchase a copy of the book, as illustrated in the example situation 360 of FIG. 3D. If the user had already purchased a copy of the book in electronic form, for example, the ribbon could instead provide an action that, when selected, causes the e-book to be displayed in an e-book reader application, for example. Various other actions can be taken as well.

In many instances, as mentioned, there can be multiple actions that can be taken. For example, a phone number might be used for text messaging, a voice call, or a video call. If a URL contains a foreign word, actions might include opening the URL in a Web browser or translating the word. Various other actions can apply as well. Accordingly, in at least some aspects the types of action may be selectable by a user, or the algorithms for suggesting these actions might be ranked or otherwise prioritized. For example, an object being recognized as a URL might always take precedence over the object being identified to contain a foreign term, as the user will be more likely on average to want to follow the URL than to translate it. In some cases, such as where a user can make a voice, video, or VoIP call, for example, the device might analyze the user's historical usage or present the user with options or preferences, for example, that can determine which action to provide to the user in a ribbon. In at least some aspects, the ribbon can contain an option that enables the user to view other available actions, and select one or more of those actions to be performed.

Figure 5:
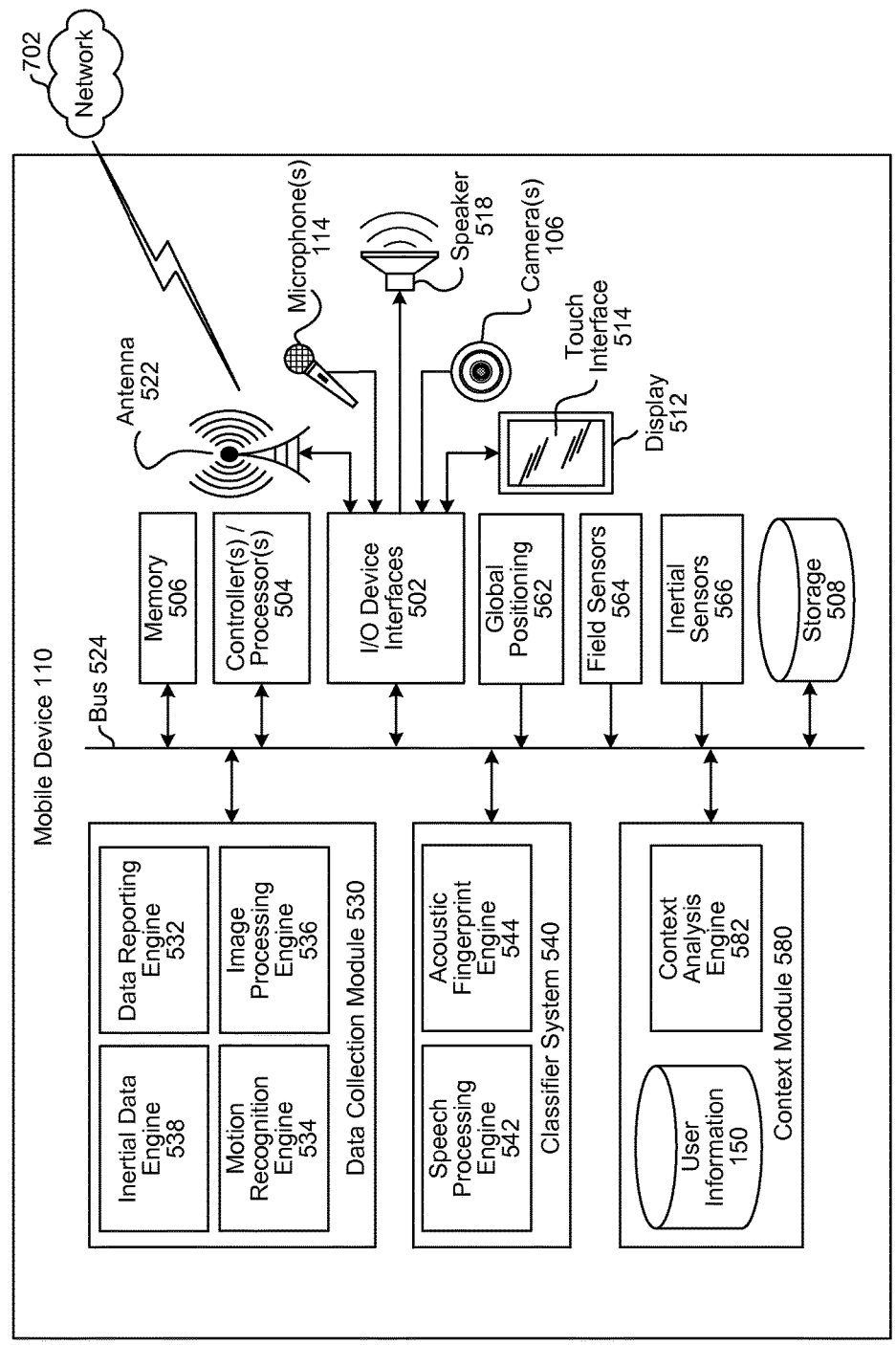
FIG. 5 is a block diagram conceptually illustrating example components of a mobile device supporting frictionless collection of user opinions.

FIGS. 4 and 5 illustrate block diagrams conceptually illustrating components of the system 100. Depending upon how the system 100 is structured, some of components shown in FIG. 4 as part of server 120 may include included in the mobile device 110, and some of the components shown in FIG. 5 as part of mobile device 110 may be included in the server 120. In operation, the system 100 may include computer-readable and computer-executable instructions that reside in storage 408/508 on the mobile device 110 or server 120.

Mobile device 110 and server 120 may be any computing devices, or a collection of computing devices, and are referred to herein as "mobile device" and "server" to facilitate understanding based upon an example system architecture. Other arrangements are possible, such as device 110 being one-or-more fixed (non-mobile) terminals placed in front of product displays within a store or booths at a convention, recognizing a passerby by facial recognition or electronic tagging (e.g., an radio-frequency identification (RFID) tag in a name badge or by device-specific mobile phone emanation) and performing information recognition/action execution by a person operating the terminal.

Each of the mobile device 110 and the server 120 may include one or more controllers/processors 404/504 comprising one-or-more central processing units (CPUs) for processing data and computer-readable instructions, and a memory 406/506 for storing data and instructions. The memory 406/506 may include volatile random access memory (RAM), non-volatile read only memory (ROM), non-volatile magnetoresistive (MRAM) and/or other types of memory. The mobile device 110 and the server 120 may also include a data storage component 408/508 for storing data and processor-executable instructions. The data storage component 408/508 may include one or more non-volatile storage types such as magnetic storage, optical storage, solid-state storage, etc. The mobile device 110 and server 120 may also be connected to a removable or external non-volatile memory and/or storage (such as a removable memory card, memory key drive, networked storage, etc.) through the input/output device interfaces 402/502.

Executable instructions for operating the device 110, the server 120, and their various components may be executed by the controller(s)/processor(s) 404/504, using the memory 406/506 as temporary "working" storage at runtime. The executable instructions may be stored in a non-transitory manner in non-volatile memory 406/506, storage 408/508, or an external device. Alternatively, some or all of the executable instructions may be embedded in hardware or firmware in addition to or instead of software.

Referring to FIG. 4, the server 120 is connected to a network 702 via input/output device interfaces 402. The input/output device interfaces 402 may also include an interface for an external peripheral device connection such as universal serial bus (USB), FireWire, Thunderbolt or other connection protocol. The input/output device interfaces 402 may connect to one or more networks 702 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The server 120 may include an address/data bus 424 for conveying data among components of the server 120. Each component within the server 120 may also be directly connected to other components in addition to (or instead of) being connected to other components across the bus 424.

The server 120 may further include a recognition module 430 that performs recognition on content captured by the mobile device 110, such as the recognition operations discussed above. For example, the mobile device 110 may send image data (either raw or processed) to the server 120 for the server to perform recognition on the image data. The image data may include single still images, a video feed, or portions of still images or a video feed, such as isolated or processed portions thereof. The recognition module 430 may include a variety of components, including an image recognition engine 460, OCR engine 462, recognition database 430, or other components such as an audio recognition module (not shown) or the like. The recognition database 468 may store data used by the various engines/processors of the recognition module 430 such as image data, audio data, OCR language models, OCR dictionaries, and the like. The recognition module 430 may communicate with the context module 480 when performing recognition of objects in data provided by the mobile device 110. In one aspect, the engines 460 and 462 may reference content in the context module 480 during processing. In another, potentially overlapping aspect, information in the recognition database 468 may be updated through interactions with the context module 480 so that the recognition processes may incorporate context data.

The context module 480 may track and apply context data during object discovery and recognition and during determination of a potential action to be performed based on recognized objects and/or information. The context module 480 may include various components such as those illustrated. The context analysis engine 582 receives information from sensors on the mobile device 110 and determines a context of device 110 by comparing the sensor-derived information with context-related information stored in various databases, and applying set of dynamic models (e.g., Bayesian) and filters to the results of the comparison to determine context. For example, the context analysis engine 582 may determine information about the location of the mobile device 110 by comparing location information with information in a location database 444 (e.g., an database that correlates geographic location with businesses and related information). The context analysis engine 582 may compare information from the mobile device 110 with information in one or more activity databases 446 to correlate information with activities associated with the identified location (e.g., a sporting event, festival, or other event). For example, if motion information is provided (e.g., speed and direction of motion, type of motion), physical activities associated with the location and/or motion information may be compared. As another example, if captured audio is provided and the location is associated with recorded performances such as a movie theater, a library of acoustic fingerprints may be checked to see if the activity (e.g., the particular movie) can be identified. As another example, if the location is associated with the business, an activity database 246 may be queries to determine schedules, services, products, etc. associated with that business. The context analysis engine 582 may compare information about a user associated with the device 110 with information about that user and/or device stored in one or more user information databases 150, and correlate the results with information about the current time, the location of the mobile device, information about user behavior, etc. User information databases 150 may include information about such as a user's contacts, social media accounts, etc. The user information databases 150 may also include historical information for users such as user behavior in certain context (i.e. at different locations, with different applications, etc.). The user information databases 150 may be customized to individual users or may include information regarding multiple users in a single database. The user information databases 150 may exchange information with mobile device(s) 110 to keep the user information databases 150 current.

Context may be determined by applying dynamic models and filters stored in metrics templates 450 to the various pieces of information. Each of the metrics templates may also be associated with certain kinds of text or objects that may be recognized, so as to determine, using the metrics, when to apply context-based considerations to recognition and/or action selection. If the collected context data conforms (or is sufficiently similar to exceed a quantitative threshold) to one or more of the models and filters of a metrics template, then the context module 480 may be used to inform the behavior of the recognition module 430 and/or function module 470.

Object/text recognition may be based on context data to improve recognition results. For example, if an OCR process may result in multiple possible text results, the context data may be used to resolve ambiguities in the text results, potentially resulting in a more accurate result. When analyzing a glyph (an as-yet unidentified marking) and recognizing it as a text character, a weighting algorithm may be used. The context data may be used to alter weights in the weighting algorithm. For example, if an OCR process has recognized seven characters in an eight character string, if there is an eight character word in the context data that matches the first seven characters (for example a travel destination in a user's calendar), that word (and/or its corresponding eighth character) may be weighted more heavily than other choices. Context data may be used to inform initial OCR results or to alter OCR results, for example when a system may use spell correct algorithms. In one example, an OCR engine 462 may reweight or customize OCR language models or trusted dictionaries based on context data, for example user profile data for the user of the mobile device 110. The reweighted or customized language models or trusted dictionaries may incorporate words or text data associated with the user. They may also incorporate words or text associated with other individuals who themselves may be associated with the user (such as the user's social network friends or acquaintances or other individuals who share a group identity with the user).

In one example, context data may include data related to other image types similar to those currently being analyzed by the system. As an example, if an image is recognized to be a business card, the system may consider how previous business cards were analyzed when performing object/text recognition for the current image. This type of context data may be called image group association data, that is data related to other images in a group that may be associated with the present image being considered. Such image group association data may be used in object/text recognition and/or function selection.

The function module 470 operates to select one or more functions to present to a user, for example in ribbons 244, 264, or 282. The functions may be based on objects recognized in an image feed from a mobile device 110. Selection of one of the functions by the user leads to execution of the function by the mobile device 110, server 120, or other device. Accordingly, the function module 470 may communicate with one or more other components such as application modules of the mobile device 110, other servers, etc.

For example, if a function module 470 determines that based on recognition of a telephone number by recognition module 430, the user should be presented with options to dial a telephone number or add the number to a contact, the function module 470 may send a command to a telephone application of a mobile device 110 if the user selects the function to make a call, or the function module 470 may send a command to a contact module (located either at the mobile device 110 or elsewhere) if the user selects the function to add to a contact. As explained below, the function module 470 communicates with the context module 480 to base function selection decisions on context data, for example by prioritizing a contact add function to a call function based on prior user activity. The function module may include components such as a function selection engine 452 which analyzes the recognition and context data to select one or more functions to offer to a user and their relative priority and a function database 458 which stores information used by the function selection engine 452. Although multiple storage entities are illustrated, the various storage/databases 468, 444, 446, 150, 450, 458, and/or 408 may be combined in various configurations.

Determination of potential user-selectable functions based on the recognized object/text may also be based at least in part on context data. For example, if an object recognition system detected an address in an image, it may normally determine that a user may wish to add the address to a contact, get driving direction to the address, pull the address up in a mapping application, etc. However if context data, such as information in a user profile, indicates that a user has been searching real estate listings (for example browsing real estate websites on a device) and an address is detected, the system may determine that a user may wish to check the address using a real-estate website or application and may determine that a potential function is accessing the address in a real-estate application resident on the user's mobile device 110. In another example, if a user profile indicates that a user has been requesting object recognition on multiple images within a certain timeframe, and a number of those images have included address, which the user has then added to a specific list (such as "business contacts" or "Christmas card list") the system may determine that one of the potential user-selectable functions should be adding the recognized address to the specific list. In another example, the system may use context data to determine that recognized text in an image is in a language that is not one that the user of the mobile device 110 uses, where the language(s) used by a user may be included in the user's profile. The system may then offer to translate the text in addition to offering other potential functions. Potential user-selectable functions may be assigned a priority by the system, where the priority is based at least in part on the context data. The user-selectable functions may then be presented as options to the user based on the priority, for example by having higher priority options presented first in a list or in different colors, shapes, etc. than lower priority functions.

Referring to FIG. 5, the system 100 may include a variety of sensors such as those illustrated with mobile device 110. Among the sensors are an audio capture component such as microphone(s) 114, an image and/or video capture component such as camera(s) 106, a touch interface 514, an antenna 522, global positioning sensors 562, field sensors 564 (e.g., a 3-axis magnetometer, a gravity sensor), and inertial sensors 566 (e.g., a 3-axis accelerometer, a 3-axis gyroscope). The mobile device 110 may also include one or more buttons 202 (not shown). Several of each of these components may be included. Also, although shown as integrated within device 110, some or parts of the various sensors may be external to device 110 and accessed through input/output device interfaces 502.

The antenna 522 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 114 or array of microphones, a wired headset (not illustrated), a wireless headset (e.g., wireless headset 721 in FIG. 7), etc. If an array of microphones is included, approximate distance to a sound's point of origin may be performed acoustic localization based on time and amplitude differences between sounds captured by different microphones of the array.

The touch interface 514 may be integrated with a surface of a display 512 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 562 provides an interface for acquiring location information, such as information from satellite geographic positioning system(s). For example, the global positioning module 562 may include a Global Positioning System (GPS) receiver and/or a Global Navigation Satellite System (GLONASS) receiver. The global positioning module 562 may also acquire location-based information using other radio sources (e.g., via antenna 522), such as mapping services that triangulate off of known WiFi service set identifiers (SSIDs) or cellular towers within range of the device 110.

The field sensor module 564 provides directional data. The field sensor module 564 may include a 3-axis magnetometer that measures magnetic fields and may serve as a compass. The field sensor module 564 may also include a dedicated gravity sensor to determine up-and-down.

The inertial sensor module 566 provides inertial data, and may include 3-axis accelerometer and a 3-axis gyroscope.

Examples of other sensors include an electronic thermometer to measure ambient temperature and a proximity sensor to detect whether there is an object within a certain distance of the mobile device 110.

Sensors may be communicatively coupled with other components of system 100 via input/output (I/O) device interfaces 502 and/or via an address/data bus 524. The address/data bus 524 conveys data among components of the mobile device 110. Each component within the mobile device 110 may also be directly connected to other components in addition to (or instead of) being connected to other components across the bus 524.

The I/O device interfaces 502 may connect to a variety of components and networks. Among other things, the I/O device interfaces 502 may include an interface for an external peripheral device connection such as universal serial bus (USB), FireWire, Thunderbolt or other connection protocol. The input/output device interfaces 502 may also support a variety of networks via an Ethernet port and antenna 522.

The system 100 may also include a video output component for displaying images, such as display 512. The video output component may be a display of any suitable technology, such as a liquid crystal display, an organic light emitting diode display, electronic paper, an electrochromic display, a pico projector, etc. The video output component may be integrated into the mobile device 110 or may be separate.

The system 100 may also include an audio output component such as a speaker 518, a wired headset (not illustrated), or a wireless headset (e.g., wireless headset 721). Other output devices include a haptic effect generator (not illustrated). The haptic effect generator may be of any haptics technology, including technologies to vibrate the entire device 110 (e.g., electromagnetic technologies such as vibratory motor or a coil with a central mass) and/or may comprise technologies allowing the haptic effect to be localized to a position of the touch interface 514, such as electroactive polymers, piezoelectrics, electrostatics, subsonic audio wave surface actuation, etc.

As discussed above, mobile device 110 includes controller(s)/processors 504, memory 506, and storage 508. In addition, the mobile device may include a data collection module 530, a classifier system 540, and a context module 580, each of which may comprise processor-executable instructions stored in storage 508 to be executed by controller(s)/processor(s) 504 (e.g., software, firmware), hardware, or some combination thereof. For example, components of the data collection module 530, the classifier system 540, and the context module 580 may be part of a software application running in the foreground and/or background on the mobile device 110.

The data collection module 530 gathers and processes sensor data for transmittal to the server 120 for the determination of context and to support context-related processing on the mobile device 110 itself.

A data reporting engine 532 manages reporting to the server 120. The degree of pre-processing of sensor data on mobile device 110 may depend upon how the system 100 is configured, such that the data reporting engine 532 may send varying degrees of raw and processed sensor data. Sensor data may be sent intermittently, at scheduled times, in response to a query from server 120, or based on preset thresholds or criteria, such as transmitting when changes on data from a sensor exceeds a threshold. While raw sensor data may be transmitted to server 120, processing of certain sensor data at the mobile device 110 may reduce the volume of data transmitted and provide user 10 a higher degree of privacy.

Data reporting engine 532 may collect information about device motion from a motion recognition engine 534. The motion recognition engine 534 compares real-time motion data from the field sensors 564 and inertial sensors 566 with a set of motion-signature models stored in storage 508 to characterize device motion. The motion recognition engine 534 enables the device 110 and/or the server 120 to detect particular motion patterns such as stairs, running, walking, etc. Data from the field and inertial sensors may be sampled, for example, at a rate of milliseconds.

Data reporting engine 532 may also collect information about the device's surrounding from an image processing engine 536. The image recognition engine 536 may perform image and/or text recognition such as the object recognition described above in FIGS. 2A-2D and 3A-3D. The image to be processed may be captured by the camera(s) 106 or may be obtained in other ways, such as attached to an email, text message, etc. The image processing engine may have functionality similar to the image recognition engine 460. Further the data reporting engine 532 may incorporate components similar to those of the recognition module 430. In one aspect, the image recognition engine 536 may take images from front and rear facing cameras (e.g., camera(s) 106) and perform head or face detection to determine if the display 512 is facing the user or away from the user. Head or face detection may also be used to determine if other people are detected. In addition, using the camera(s) 106 and/or the proximity detector, the image processing engine 536 may approximate a distance between a detected object and the device, such as by comparing a detected face with an average face size to approximate distance, calculating parallax across two or more cameras to determine distance, approximating distance based on optical diffraction, etc.

In one example, the image processing engine 532 may perform a certain amount of processing of image data prior to sending to the server 120. For example, if a server 120 was configured for OCR processing of the image data, the image processing engine 532 may convert color image data to black and white image data to both assist with OCR processing and reduce the bandwidth consumed when sending image data to the server. The image processing engine 532 may also identify sections of image data including text and isolate those portions for sending to the server 120 to reduce bandwidth usage and/or speed OCR processing.

Data reporting engine 532 may also collect information from a classifier system 540 to characterize sounds captured by the audio capture components. The classifier system 540 may perform both speech recognition and noise recognition on captured audio, using speech models and acoustic fingerprints stored in storage 508. The classifier system 540 may comprise, for example, a Support Vector Machine (SVM), although other machine learning techniques might be used instead of or to augment SVM. The classifier system may utilize Hidden Markov Models (HMMs), Gaussian Mixture Models (GMMs), Mel-Frequency Cepstrum Coefficients (MFCCs), etc. The speech recognition techniques and the acoustic fingerprints or models may utilize the same or similar pattern recognition techniques but with different models (e.g., speech recognition may use phoneme models whereas noise recognition may use acoustic fingerprints) or may use different techniques altogether.

The speech processing engine 542 of the classifier system 540 may perform speech recognition and natural language processing. The speech processing engine 542 of the classifier system 540 may transcribe audio data into text data representing the words of utterances contained in the captured audio data. This text data may then be used by other components on the mobile device 110 or server 120 for various purposes.

The speech processing engine 542 interprets the captured utterance based on the similarity between the utterance and models "known" to the speech processing engine 542. The speech processing engine 542 may, for example, compare the input audio data with models for sounds (e.g., speech units or phonemes) and sequences of sounds to identify words that match the sequence of sounds spoken in the utterance of the audio data. The speech processing engine 542 may output the most likely words recognized in the audio data. The speech processing engine 542 may also output multiple alternative recognized words in the form of a lattice or an N-best list.

An acoustic fingerprint engine 544 may compare captured audio with fingerprints stored in storage 508 to determine whether captured ambient noise corresponds to a specified pattern. Examples include rain, a cacophony of voices, and tire/road noise.

The classifier system 540 may also provide information quantizing detected sound levels, how many different speakers can be distinguished, and acoustic localization information characterizing a distance to a source of an utterance or sound.

Data reporting engine 532 may also collect information from an inertial data engine 538 that processes data from the global positioning sensors 562, field sensors 564, and inertial sensors 566 to calculate a speed and direction of device motion, altitude, and device attitude.

The data reporting engine 532 may selectively report this information to the server 120 in accordance with privacy settings. For example, the data reporting engine 532 may report that speech is detected, a number of detected speakers, proximity information, ambient temperature, ambient light levels, ambient noise levels, whether ambient noise corresponds to a stored acoustic fingerprint, how many faces/heads are detected, whether the display 512 is facing a person, the type of motion, device location, direction of motion, altitude, attitude, speed of motion, and radio transmitters detected within range of antenna 522, while withholding information about the content of speech and images captured by camera 106.

As mentioned above, however, data reporting engine 532 may send raw data to server 120 for processing, such that one or more of motion recognition engine 534, image processing engine 336, inertial data engine 538, and classifier system 540 may be located at server 120 and be associated with controller(s)/processor(s) 404, memory 406, and storage 408.

The mobile device 110 may also include a context module 580. Although the context module 580 on the mobile device 110 may contain the same components as, and operate similarly to, the context module 480 as shown on the server 120. For present illustration the context module 580 includes a context analysis engine 582 and a user information database 150, which may store user profile data. As illustrated the context module 580 may be capable of communicating with other information sources not necessarily located on the mobile device 110, such as a location database 444, activity database 446, social media data, etc. The context module 580 may operate under different privacy settings than the data reporting engine 532, allowing the mobile device 110 to potentially have access to sensor-derived information of the mobile device 110 that may be withheld from the server 120 due to privacy settings.

The context analysis engine 582 of the context module 580 (or context module 480) is configured to determine the context associated with image data so the context may be incorporated into object recognition processes. Although not illustrated, the mobile device 110 may also include a function module 470 configured to determine, select, and potentially execute potential user-selected functions based on recognized objects found in image data, such as that described in FIGS. 2A-2D and 3A-3D illustrated above. Both object recognition and function selection/determination may be based at least in part on context data, such as that processed by the context analysis engine 582.

The context analysis engine 582 may refer to various items of context data when determining the context and assisting in object recognition and/or determination of potential user-selectable functions. Context data may include various types of data. Context data may include, for example, sensor data from one or more sensors of the mobile device 110. Such sensors may include, for example, a microphone, a radio frequency receiver, a thermometer, a proximity sensor, a magnetometer, an accelerometer, a gyroscope, a global positioning receiver, or the like.

Context data may include data based on the location of the mobile device 110. For example, if a mobile device is determined to be located proximate to a local event (for example by cross referencing location database 444, activity database 446 and/or other sources) recognition processing and/or function selection may be based on the location information (for example, by resolving an OCR ambiguity when detecting a phone number in favor of a local area code or allowing a user to buy tickets to a local concert after recognizing a poster advertising the concert tour).

Context data may also include user profile data. Such user profile data may be stored in the user information database 150, on the mobile device 110, or elsewhere. User profile data may include media associated with the user (such as items in the user's music collection, video collection, book/ebook collection) or media available to the user through download, streaming or subscription (such as video, music, e-magazine, etc.) services. User profile data may also include applications associated with a user, such as applications available on the mobile device 110. User profile data may also include a user's purchase history for products or services (to the extent such a purchase history may be trackable and/or accessible by the system). User profile data may also include biographical or profile information of the user. User profile data may also include contact data such as phone numbers, email addresses, physical addresses, or the like for entities stored in a user contact list. User profile data may also include recommendation data or feedback data that the user has submitted for products, services, or the like. User profile data may also include user history data, such as data on a user's previous operation of one or more devices including applications and/or functions operated by a user, searches performed by a user, other objects/text recognized by a device operated by the user, etc. User profile data may also include user feedback data related to object recognition/function selection, such as whether a user indicated object/text recognition was incorrect, or what functions a user selected in response to the recognition of certain categories of objects/text. User corrections to earlier recognition/function determination processes may be used to re-train the system when performing similar processes later.

User profile data may also include, for example, social network data, such as data associated with one or more social networks of the user of the mobile device. The social network data may also include data of one or more different individuals associated with the user (e.g., friends of the user). Such social network data associated with the user may assist in object recognition (such as recognizing words during OCR that are used in a user's social networks) or in function selection (such as adding a certain address to a user's contact list when the same address appears in the contact list of many of the user's friends).

User profile data may also include user group association data. User group association data may include data related to groups of individuals associated with the user of the device. For example, other individuals in the same social networks or other groups as the user of mobile device 110. In another aspect, the system may classify the user into one or more groups (for example by age, gender, profession, hobbies, or other factors). The system may then refer to user group association data (for example data associated with those individuals) when determining the context and performing object/text recognition and function selection.

FIG. 4 is an example of an algorithm for performing context-based object/text recognition and determination of user-selectable functions. As illustrated, processes above the line 650 and below the line 652 are performed by components on the mobile device 110 and processes between the line 650 and the line 652 are performed by components on the server 120. As noted above, certain functions may be shifted from the mobile device 110 to the server 120, such that the position of the line 650 may be shifted relative to FIG. 6, and with a corresponding shift or duplication of the responsible components from the server 120 onto the mobile device 110. Other functions shown as performed by a local mobile device 110 may also be performed by the server 120 depending upon system configuration.

Beginning at start 602, sensor information and is collected (604) from the sensors at the mobile device 110. As noted above, this information and data may be processed on the mobile device 110, on the server 120, or a combination thereof. The data may be collected intermittently, at scheduled times, in response to a query from server 120, or based on preset thresholds or criteria, such as if changes exceeding a threshold are detected on one or more of the sensors.

Camera(s) 106 may be used to capture image data (606). The image data may include video data, still image data, or other image data. The mobile device 110 may then attempt to detect an object and/or text (608) using the image processing engine 536. The Image processing engine 536 may also be used to binerize the image data (610) or perform other pre-processing of the image data by the mobile device. The image data and sensor information may be sent to the server (612) over the network 702 by the data reporting engine 532 or other component of mobile device 110.

The server may then use the recognition module 430 to attempt to identify (614) an object and/or text based on the image data and based on context data. The context module 480 (or 580) may attempt to determine the appropriate context data to apply to the recognition process based on information in the context analysis engine 582, metrics templates database 450, or other components. The context analysis engine 582 may attempt to determine the context of the mobile device 110 based on the collected sensor data by correlating and cross-correlating available data with databases such at the location database 444, activity database 446, user information database 150, and/or other sources, and by applying the models and filters of the metrics templates 450 to the sensor information and correlated data. In one aspect, customized user models may be created and applied when performing object/text recognition and/or function selection. The customized user model may include certain context information related to the user, for example user profile data such as information regarding the user's social networks, contacts, travel history, purchasing behavior, device interactions, or any other context data associated with the user. The user model may be stored on a user device and sent to the server with context information (612) or may be stored elsewhere and accessed by the server when identifying objects/text and/or function selection.

Once potential objects/text have been identified, the server 120 may then attempt to determine (616) at least one potential user-selectable function to return to the user based on any identified object and/or text and appropriate context data. The function selection engine 452 of the function module 470 may communicate with the context module 480 to determine and/or prioritize potential functions. The potential functions may then be sent (618) from the server 120 to the mobile device 110. The mobile device 110 may then display (620) the potential function(s) to the user and, if one is selected by the user, execute (622) the selected function. For purposes of illustration, execution of the selected function is performed by the mobile device 110, although other devices, including server 120, may be involved in actual execution of the function if the function calls for operations outside the mobile device (for example, purchasing tickets to an event, submitting a product review, etc.).

The potential functions may related to one or more identified objects and/or items of text. For example, if the server identifies two websites and one address, the potential functions may include (1) accessing the first website, (2) accessing the second website, (3) getting directions to the address, (4) storing the address in a contact list, (5) identifying who lives at the address, etc. The different potential functions may be presented to the user according to their relative priority, as described herein.

Referring to FIG. 7, different mobile devices 110a to 110e may contain different components of the system 100 and the devices may be connected over a network 702 to one or more servers 120. For example, the smart phone 110a, and/or tablet computer 110c may each include the data collection module 530 and the context module 580, but the object recognition may be carried out using a recognition module 430 located at the server 120. In the same system, the laptop computer 110b may include the data collection module 530, the classifier system 540, and the context module 580. Also in the same system, the augmented reality (AR) glasses 110b and smart watch 110e may include the data reporting engine 532 of the data collection module 530, but object recognition may be carried out by components resident on the server 120. Similarly, the camera 110f may include the data collection module 530, but rely on a classifier system 540 and context module 580 located on the server 120. As same server or cluster of servers 120 may support each of these devices individually according to their individual capabilities within a same system. Other device examples may also be included in the system.

Based on the differences between mobile devices 110a to 110e, the sensors available, the collection and pre-processing of sensor data, the user information, previous user interactions with one or more devices, etc. the applying context data to recognition results and the determination of potential user-selectable functions may be different for each individual device 110a to 110e. For example, a smart watch 110e may be equipped with a camera to capture image data for recognition processing but may send the raw image data to the server 120 and rely on the server 120 for recognition processing and selection of potential user-selectable functions whereas smartphone 110a may perform some image processing (such as bannerization) prior to sending image data to the server, whereas tablet 110d may perform some context analysis and OCR on its own without relying on the server for such functions.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving social network data associated with a first user profile corresponding to a mobile computing device, the social network data including information related to one or more different user profiles linked, within a social network, to the first user profile;
   receiving image data from the mobile computing device;
   performing image processing on the image data to identify text in the image data;
   recognizing actionable text in the identified text;
   determining a plurality of potential user-executable functions, wherein the determining is based at least in part on the actionable text and wherein the plurality of potential user-executable functions includes at least one of creating a new contact entry based on the actionable text, adding information in the actionable text to an existing contact, showing a map based on the actionable text, dialing a telephone number included in the actionable text, or accessing a website included in the actionable text;
   determining, based at least in part on the social network data, a primary user-executable function of the plurality of potential user-executable functions;
   causing the mobile computing device to display an icon, the icon including at least two user-selectable portions including:
     a first user-selectable portion that, when selected, causes execution of the primary user-executable function, and
     a second user-selectable portion that, when selected, causes execution of an action to display additional user-executable functions of the plurality of potential user-executable functions;
   receiving an indication of a user selection of the first user-selectable portion corresponding to the primary user-executable function; and
   executing the primary user-executable function.

2. The computer-implemented method of claim 1, further comprising recognizing an address in the actionable text, and wherein:
   the prior operation of the mobile computing device by the user comprises viewing content related to a geographic region on the mobile computing device; and the recognizing the address further comprises recognizing one or more characters in the text based on the geographic region.

3. The computer-implemented method of claim 1, wherein the actionable text comprises at least one of a physical address, a telephone number, a website address, or an email address.

4. The computer-implemented method of claim 1, wherein the mobile computing device is caused to display the icon such that the first user-selectable portion is larger than the second user-selectable portion.

5. The computer-implemented method of claim 1, wherein the determining the plurality of potential user-executable functions is based at least in part on the social network data.

6. A computing system, comprising:
at least one processor; and
a computer-readable medium encoded with instructions which, when executed by the at least one processor, cause the computing system to:
to receive image data, the image data including text data;
to receive social network data associated with a first user profile corresponding to the computing system, the social network data including information related to one or more different user profiles linked, within a social network, to the first user profile;
to perform character recognition of the text data;
to determine a plurality of potential user-selectable functions based at least in part on recognized characters of the text data;
to determine, based at least in part on the social network data, a first user-selectable function of the plurality of potential user-selectable functions;
to cause display of an icon to the user, the icon including at least two user-selectable portions including:
a first user-selectable portion that, when selected, causes execution of the first user-selectable function; and
a second user-selectable portion that, when selected, causes execution of an action to cause display of additional user-selectable functions of the plurality of potential user-selectable functions.

7. The computing system of claim 6, wherein the computer-readable medium is encoded with additional instructions which, when executed by the at least one processor, further cause the computing system to determine a relative priority for each of the plurality of potential user-selectable functions based at least in part on the social network data.

8. The computing system of claim 7, wherein the computer-readable medium is encoded with additional instructions which, when executed by the at least one processor, further cause the computing system to determine the first user-selectable function based at least in part on the relative priority.

9. The computing system of claim 6, wherein the image data includes second text data and wherein the computer-readable medium is encoded with additional instructions which, when executed by the at least one processor, further cause the computing system:
to perform character recognition of the second text data;
to determine at least one second potential user-selectable function based at least in part on recognized characters of the second text data; and
to determine a relative priority between each of the plurality of potential user-selectable functions and the at least one second potential user-selectable function based at least in part on the social network data.

10. The computing system of claim 6, wherein the computer-readable medium is encoded with additional instructions which, when executed by the at least one processor, further cause the computing system to determine a category of the text data, and wherein determination of the first user-selectable function is based at least in part on a previously selected user function associated with the category of the text data.

11. The computing system of claim 10, wherein the previously selected user function is a function selected by the user associated with the image data.

12. The computing system of claim 6, wherein the computer-readable medium is encoded with additional instructions which, when executed by the at least one processor, further cause the computing system:
to receive the image data from a user device; and
to identify the plurality of potential user-selectable functions in a communication to the user device.

13. The computing system of claim 6, further comprising:
a camera to capture the image data; and
an interface to display the icon.

14. The computer-implemented method of claim 6, wherein the computer-readable medium is encoded with additional instructions which, when executed by the at least one processor, further cause the computing system to cause the display of the icon such that the first user-selectable portion is larger than the second user-selectable portion.

15. The computer-implemented method of claim 6, wherein the computer-readable medium is encoded with additional instructions which, when executed by the at least one processor, further cause the computing system to determine the plurality of potential user-executable functions based at least in part on the social network data.

16. A non-transitory computer-readable storage medium encoded with instructions which, when executed by at least one processor of a computing system, cause the computing system:
to receive image data, the image data including text data;
to receive social network data associated with a first user profile corresponding to the computing system, the social network data including information related to one or more different user profiles linked, within a social network, to the first user profile;
to perform character recognition of the text data;
to determine a plurality of potential user-selectable functions based at least in part on recognized characters of the text data;
to determine, based at least in part on the user social network data, a first user-selectable function of the plurality of potential user-selectable functions;
to cause display of an icon to a user, the icon including at least two user-selectable portions including:
a first user-selectable portion that, when selected, causes execution of the first user-selectable function; and
a second user-selectable portion that, when selected, causes execution of an action to cause display of additional user-selectable functions of the plurality of potential user-selectable functions.

17. The non-transitory computer-readable storage medium of claim 16, wherein the computer-readable medium is encoded with additional instructions which, when executed by the at least one processor, further cause the computing system:

to determine a relative priority for each of the plurality of potential user-selectable functions based at least in part on the social network data.

18. The non-transitory computer-readable storage medium of claim 17, wherein the computer-readable medium is encoded with additional instructions which, when executed by the at least one processor, further cause the computing system to determine the first user-selectable function based at least in part on the relative priority.

19. The non-transitory computer-readable storage medium of claim 16, wherein the image data includes second text data and wherein the computer-readable medium is encoded with additional instructions which, when executed by the at least one processor, further cause the computing system:
- to perform character recognition of the second text data;
- to determine at least one second potential user-selectable function based at least in part on recognized characters of the second text data; and
- to determine a relative priority between each of the plurality of potential user-selectable functions and the at least one second potential user-selectable function based at least in part on the social network data.

20. The non-transitory computer-readable storage medium of claim 16, wherein the computer-readable medium is encoded with additional instructions which, when executed by the at least one processor, further cause the computing system to determine a category of the text data, and wherein determination of the first user-selectable function is based at least in part on a previously selected user function associated with the category of the text data.

21. The non-transitory computer-readable storage medium of claim 20, wherein the previously selected user function is a function selected by the user associated with the image data.

22. The non-transitory computer-readable storage medium of claim 16, wherein the computer-readable medium is encoded with additional instructions which, when executed by the at least one processor, further cause the computing system:
- to receive the image data from a user device; and
- to identify the plurality of potential user-selectable functions in a communication to the user device.

23. The non-transitory computer-readable storage medium of claim 16, wherein the computer-readable medium is encoded with additional instructions which, when executed by the at least one processor, further cause the computing system:
- to capture the image data using at least one camera; and
- to display the icon.

24. The non-transitory computer-readable storage medium of claim 16, wherein the computer-readable medium is encoded with additional instructions which, when executed by the at least one processor, further cause the computing system to cause the display of the icon such that the first user-selectable portion is larger than the second user-selectable portion.

25. The non-transitory computer-readable storage medium of claim 16, wherein the computer-readable medium is encoded with additional instructions which, when executed by the at least one processor, further cause the computing system to determine the plurality of potential user-executable functions based at least in part on the social network data.

* * * * *